United States Patent
Spink

(10) Patent No.: US 6,307,636 B1
(45) Date of Patent: Oct. 23, 2001

(54) METHOD FOR TELEMEASURING AND TELEMETER

(75) Inventor: Roger Spink, Berneck (CH)

(73) Assignee: Leica Microsystems AG, Heerbrugg (CH)

( * ) Notice: Subject to any disclaimer, the term of this patent is extended or adjusted under 35 U.S.C. 154(b) by 0 days.

(21) Appl. No.: 09/308,593

(22) PCT Filed: Nov. 19, 1997

(86) PCT No.: PCT/EP97/06460

§ 371 Date: May 21, 1999

§ 102(e) Date: May 21, 1999

(87) PCT Pub. No.: WO98/23989

PCT Pub. Date: Jun. 4, 1998

(30) Foreign Application Priority Data

Nov. 22, 1996 (CH) .................................................. 2881/96

(51) Int. Cl.[7] .................................................. G01B 11/14
(52) U.S. Cl. .......................................... 356/614; 356/624
(58) Field of Search .................................. 356/375, 372, 356/373, 400, 399

(56) References Cited

U.S. PATENT DOCUMENTS

| | | | |
|---|---|---|---|
| 3,710,798 | 1/1973 | Bredemeier | 128/303.1 |
| 3,741,654 | 6/1973 | Brenholdt | 356/4 |
| 4,238,157 | * 12/1980 | Strauch et al. | 356/3 |
| 4,272,190 | * 6/1981 | Shapiro | 356/124 |
| 4,410,242 | 10/1983 | Muller et al. | 351/211 |
| 4,769,523 | * 9/1988 | Tanimoto et al. | 356/400 |
| 4,888,490 | 12/1989 | Bass et al. | 250/561 |
| 5,545,160 | 8/1996 | O'Rourke | 606/10 |

FOREIGN PATENT DOCUMENTS

| | | |
|---|---|---|
| 1 405 241 | 11/1965 | (FR) . |
| 7-72090 | 9/1993 | (JP) . |
| WO 95/27917 | 10/1995 | (WO) . |
| WO 95/27918 | 10/1995 | (WO) . |

OTHER PUBLICATIONS

Schwarz, et al. "Navigierte Neurochirurgie—High–Tech Für die Gesundheit", Zeiss Information Mit Jenaer Rundschau, 4: pp 4–6, (1995) No. 5.

* cited by examiner

Primary Examiner—Frank G. Font
Assistant Examiner—Roy M. Punnoose
(74) Attorney, Agent, or Firm—Foley & Lardner

(57) ABSTRACT

The invention relates to enhanced telemeasuring involving the use of laser beams which are initially directed onto a lens (18) in a parallel beam path and which are bundled by the lens (18) into focus. If the object plane is not located in focal point (A), two laser illuminated points (P) can be seen on the object plane. If these laser illuminated points are additionally coded, e.g. in the form of a horizontal or vertical line by corresponding additional lenses or masks in front of the lens (18), images of markings can be obtained. A time coding could also be included so that, for example, one time-delayed laser illuminates after another. The distance between both laser illuminated points serves a measure for the distance of the main lens (18) from the object plane, whereby this measure is computationally dependent upon the focal range of the lens (18) and the stereoscopic basis of both illumination sources in front of the lens (18).

10 Claims, 4 Drawing Sheets

METHOD FOR TELEMEASURING AND TELEMETER

FIELD OF THE INVENTION

The invention relates to a method for measuring the distance between an objective and an object, and to a distance measuring instrument which operates according to this method.

BACKGROUND OF THE INVENTION

In connection with microscopes, in particular, users need to know the distance from their object to the objective of the microscope.

The most varied methods have been proposed for this purpose. For example, there are transit-time measurements using pulse-coded laser beams. Various optical methods, such as the split-image method or triangulation method, are also known. Thus, for example, the so-called MKM microscope design from the Zeiss company applies a pulsing laser beam which is directed onto the focus. If the object plane is located in the Z-direction upstream or downstream of the focal plane, the laser luminous point blinks left or right of the optical axis of the microscope. Whereas the first method is electronically complicated and affected by functional errors, the second method requires a substantial optical outlay.

BRIEF SUMMARY OF THE INVENTION

It is therfore the object of the invention to find a new method for measuring distances which is easy to evaluate in optical terms and permits reliable measurement of distances.

The method is implemented according to the invention by means of the features described herein and the device is designed in accordance with the features described herein.

An important idea is for two essential parallel beams (as a rule, but not exclusively, these are laser beams) to be directed in the parallel beam path of a microscope onto the objective or through the objective. Even if the focal length of the objective is not known, it can be measured exactly by virtue of the fact that the two beams—brought to converge at the focus—appear as a single luminous point. The distance from the principal plane of the objective then corresponds to the focal length. If, however, the object plane is not located at the focal point, that is to say is located at a distance differing therfrom, two laser luminous points are seen on the object plane. The distance for the two laser luminous points from one another is a measure of the difference between the focal plane and the object plane. The distance can be determined by computation as a function of the focal length of the objective and the stereobase of the two luminous light sources by the objective. By means of a geometric coding of the laser luminous points, for example in a horizontal or vertical line, by corresponding upstream lenses or masks in the laser beam path, images of such markings are obtained, with the result that a negative or positive distance from the focal plane can be detected as well.

Variants of this and further specific designs are described in the dependent claims. Thus, for example, instead of the geometric coding it is possible to provide temporal coding in which, for example, one laser beam lights up on one occasion and then the other lights up with a time shift. It is not imperative according to the invention for the two laser beams actually to be present in parallel upstream of the parallel beam path of the objective. Any desired angular deviations from parallelism are conceivable, if the objective or the microscope is calibrated after installation of the elements producing laser light, and the calibration is taken into account in the calculation. In the case of such a design variant, a specific, defined distance between luminous points in the object plane indicates a focused state of the objective with reference to the object plane.

The accuracy of the measurement of distance according to the invention is influenced by the angle $\chi$ which the two beams form with one another.

A good measurement result occurs at $\chi=90°$.

Also important is the position of the object plane relative to the optical axis. If these are mutually perpendicular, measurement is performed without any problem. There is no need for correction. The measuring points are then situated symmetrically relative to the optical axis. In the case of asymmetry, compensation can be performed computationally by measuring the respective distance of the respective measuring points from the optical axis and calculating back from there to the inclined position of the object plane. The position of the optical axis can be detected optically in this case in a simple way in as far as it is displayed by the point of intersection of the laser beams as soon as it becomes visible. The measuring system can thus be calibrated.

Of course, the optical frequency of the laser beams can be in the visible and also in the invisible region if appropriate detecting means are provided. Thus, for example, in the infrared region it is possible to use CCDs as detection means.

BRIEF DESCRIPTION OF THE DRAWINGS

The investigation is represented in more detail by way of example with the aid of the drawing, in which.

DETAILED DESCRIPTION OF THE PREFERRED EMBODIMENTS

Figure 1:
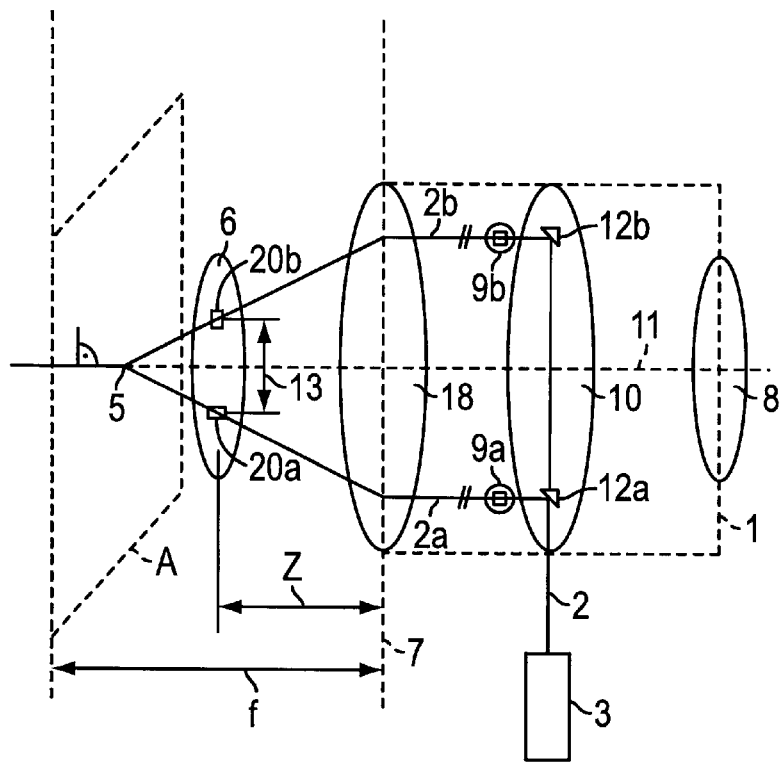
FIG. 1 shows a main objective in a symbolically represented microscope with a laser beam arrangement according to the invention, which is represented in stylized fashion.

Despite the representation of the invention with the aid of a microscope, it is not limited to microscopy. It can be used in the case of any kind of beam paths with at least one main objective.

Arranged in a microscope 1 with a main objective 18, and eyepiece 8 and an optical axis 11, is a transparent backing plate 10 which supports two deflecting mirrors 12a and 12b. 12a and 12b are aligned in the exemplary embodiment represented, which does not impose limitations. The deflecting mirror 12a is a semitransparent beam-splitting mirror, with the result that a laser beam 2 which is emitted from a laser radiation source 3 arranged, as the case may be, outside the microscope is split into two component beams 2a, 2b.

Arranged downstream of the deflecting mirrors 12a, 12b are stops 9a and 9b which code the laser component beams 2a and 2b optically. Upon traversing the main objective 18, the parallel laser component beams 2a and 2b are angled away in the direction of the focal point 5, located in the focal plane A, of the main objective 18. If an object 6 is located outside the focal plane A, the laser component beams 2a and 2b produce two luminous markings 20a and 20b on the object 6. The distance 13 between the two luminous markings 20a and 20b is a measure of the distance Z between the principal plane 7 of the main objective 18 and the object 6 or the difference f (focal length) minus Z.

Figure 2:
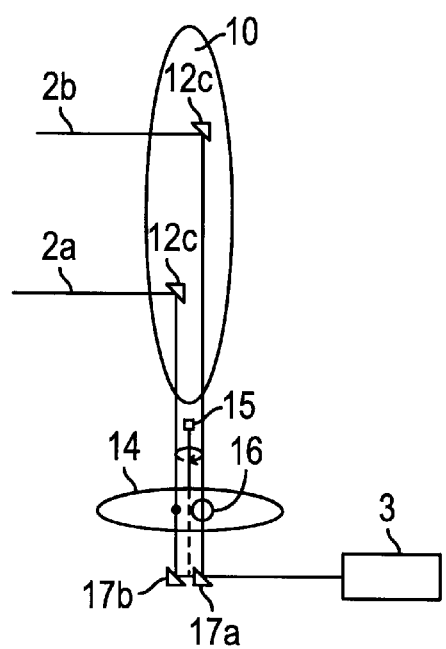
FIG. 2 shows a variant thereof.

FIG. 2 shows a variant for time-coded component beam paths 2a and 2b which are produced by virtue of the fact that the laser beam is deflected by two deflecting mirrors 17a and 17b, which are aligned with one another, in the direction of further deflecting mirrors 12c which are not aligned with one another, but are arranged upstream of the main objective 18. In this case, the deflecting mirror 17a is semitransparent. Located between the deflecting mirrors 17 and 12 is a rotating pinhole stop 14 with a hole 16, which is set rotating by a drive 15. Only when the hole coincides with a component beam path 2a or 2b can the latter be focused by the main objective 18.

Instead of the pinhole stop 14 represented, it is also possible, of course, to use all the shutters known in the prior art. As an alternative, it is also possible to use two pulsed lasers. Instead of a geometric or a pulsed coding, it is also possible, of course, to provide a color coding. The variants represented in FIGS. 1 and 2 are also theoretically suitable for reading out distance with the naked eye. Thus, for example, it is possible to provide in the viewing beam path a scale which permits the user, who looks through the eyepiece 8, to measure the distance between the two luminous points 20a and 20b.

Figure 3:
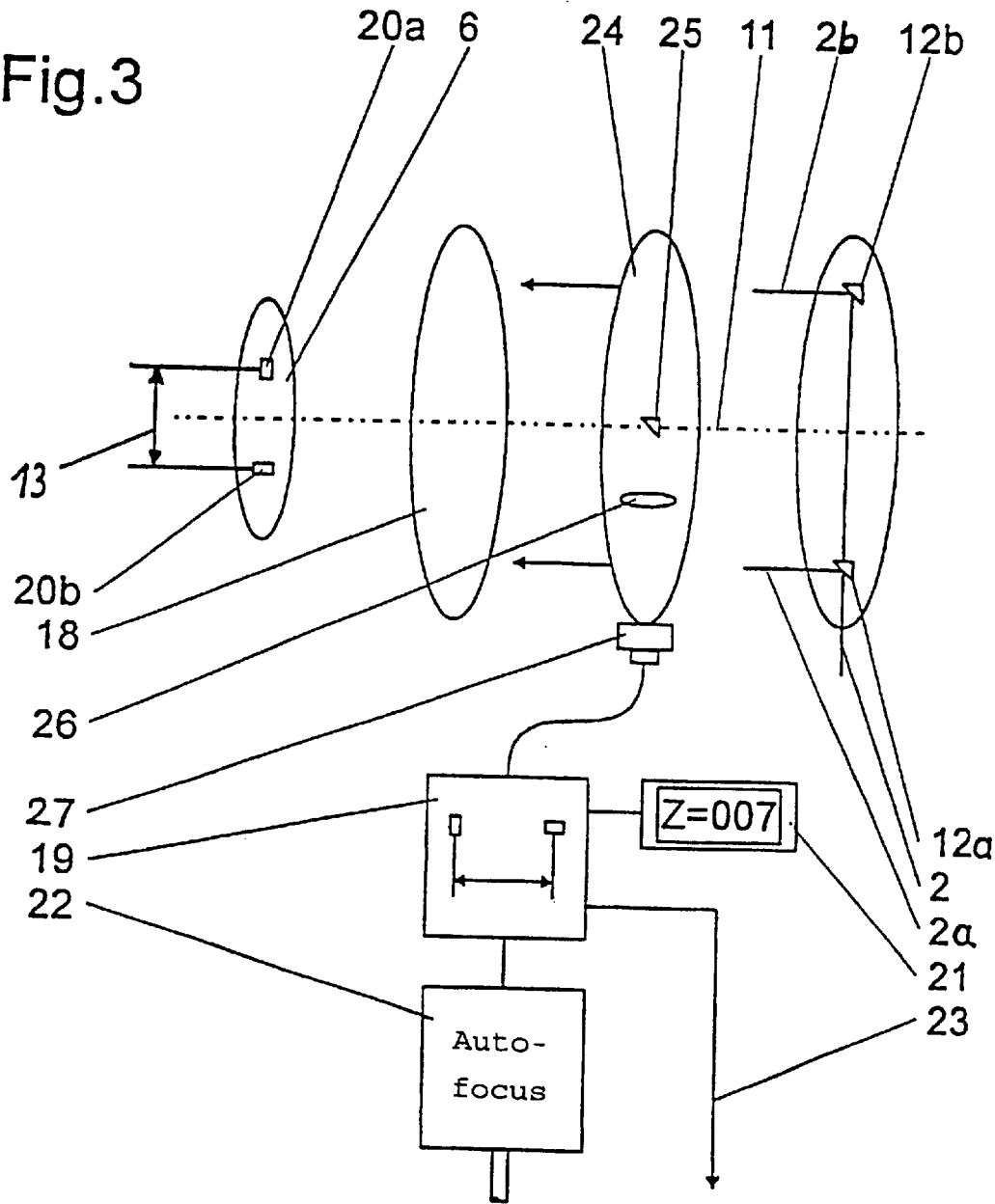
FIG. 3 shows a symbolic evaluation circuit.

However, the readout electronic system represented in FIG. 3 is preferred. FIG. 3 is represented as a detail of the design according to FIG. 1. A planar transparent optics holder 24 supports approximately centrally a deflecting mirror 25 which projects a portion of the beam coming from the object 6 onto a spatially sensitive optoelectronic detector 27, for example a CCD, via an imaging system 26. The optics holder 24 is fitted immediately downstream of the main objective 18 in the parallel beam path. In this way, the optical images 20b and 20a shining on the object 6 can be imaged on the detector 27. A display 21 for indicating the Z-distance is, for example, connected to an evaluation unit 19 with evaluation software and a corresponding computer. However, it is also possible on the output side to connect to the evaluation unit 19 components which control the microscope such as, for example, an autofocus 22 or an output 23 for stereotactic applications, in particular for determining the relative positions of the microscope 1 and the object 6.

The optics holders 10 and 24 and the small deflecting elements 12a, b, c, 17a, b can be gathered from the teaching of Patent Applications PCT/EP 95/01311 and PCT/EP 95/01301. Of course, all other conventional methods for reflecting information into or extracting information from a beam path are within the scope of the invention. However, the method with the transparent optics holders is preferred.

It is not imperative for a parallel beam path to prevail upstream of the main objective 18, it is also possible for the laser beams to go through the main objective 18 at any desired angle, if subsequently calibration is carried out and it is established that a specific distance 13 of the luminous points in the object plane corresponds to a focused state of the main objective 18 with reference to the object plane.

Figure 4:
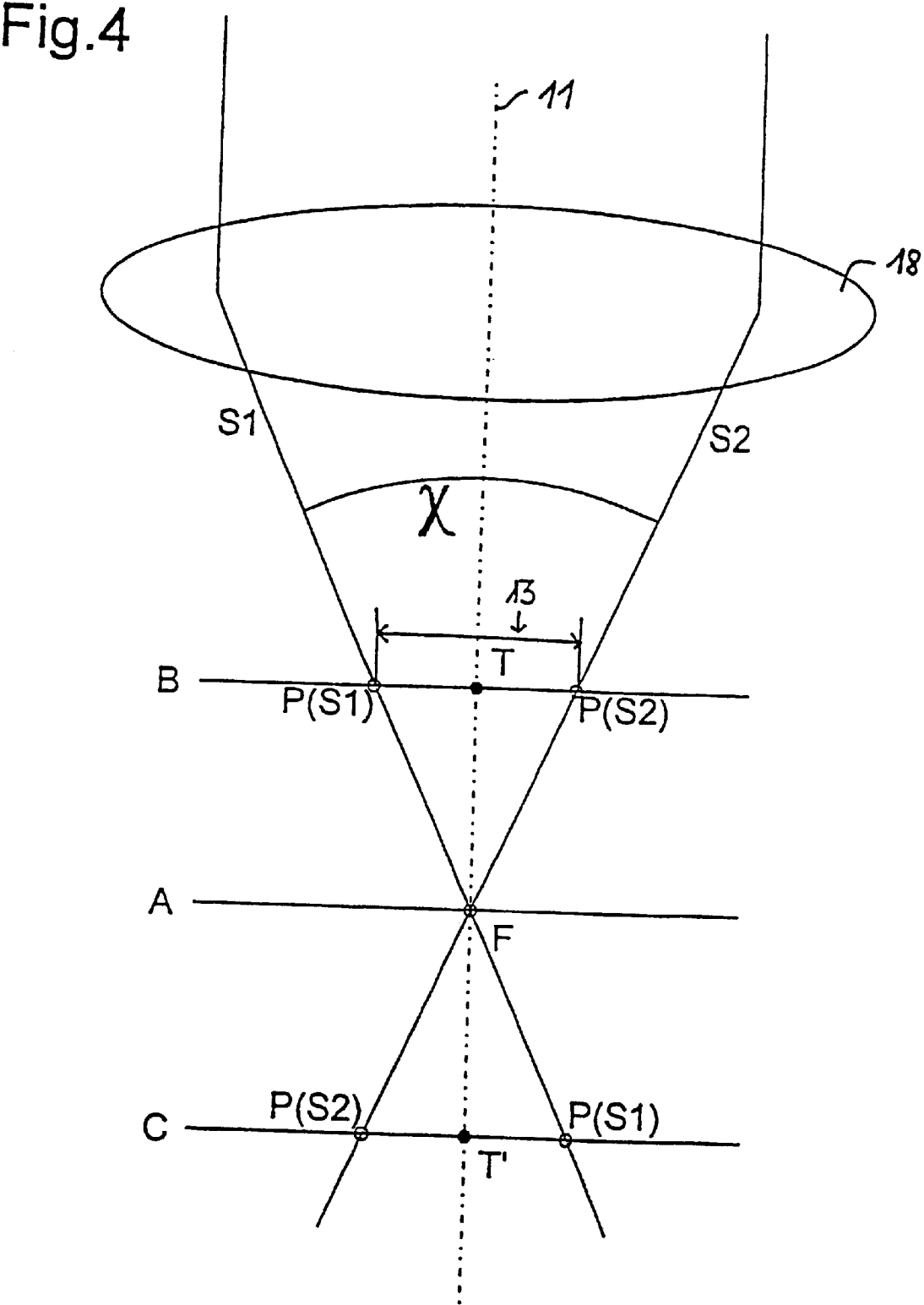
FIG. 4 shows the laser beam path downstream of the main objective.

The symbolic representation of FIG. 4 shows the following: a point T which is to be observed is visible upstream of the focal point F. The laser beam S1 produces a point P(S1) in the plane B. The laser beam S2 produces a point P(S2). P(S1) differs from P(S2). The distance of the observed point T from the focal plane A is yielded from the distance 13 of the two points. If the position of the two points relative to one another is now considered, it is possible to state whether the distance between T and A received a positive or negative sign. If the observed point T is upstream of the focal point F, P(S1) is seen to the right of P(S2) through the microscope 1, and, if vice versa, the observed point T' is located downstream of the focal point F. What is decisive in this observation is that these two points P(S1) and P(S2) can be picked up separately, that is to say they must be coded. As mentioned, it is possible for them to be geometrically coded, with the result that it is therefore possible to distinguish P(S1) and P(S2) from one another, or for them to be coded appropriately in terms of time by knowing exactly when P(S1) lights up and when P(S2) lights up. This information is input into a computer or into a method, in order to calculate therefrom the position upstream or downstream of the focal point.

Figures 5, 6:
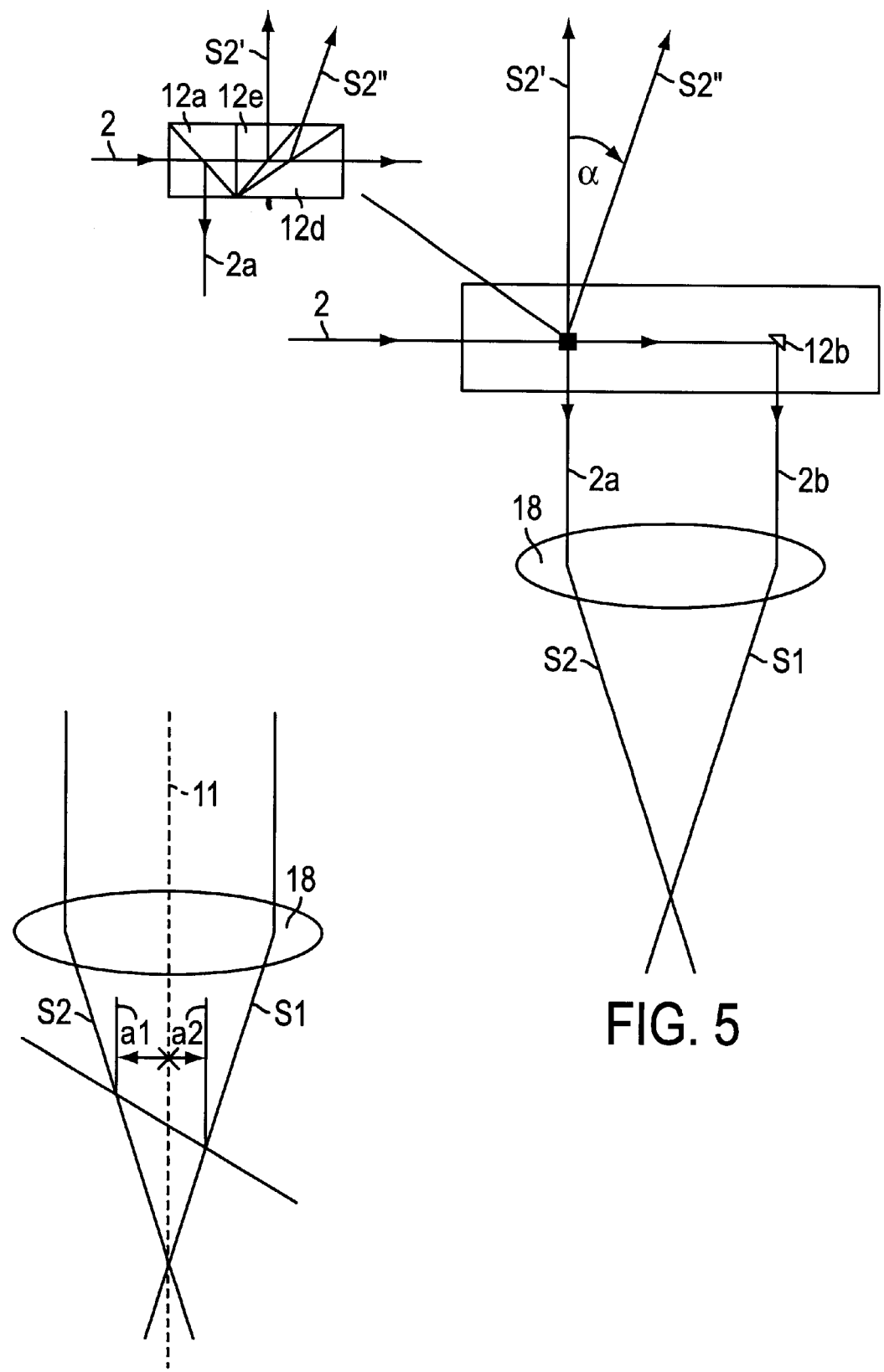
FIG. 5 shows a variant with integrated measurement of distance and magnification.
FIG. 6 shows a representation with a non-vertical image-object plane.

FIG. 5 shows a variant which not only permits the Z distance to be measured but, moreover, permits a measurement of amplification (T-measurement) via beam splitters 12e, d. For this purpose, the laser beam 2 is additionally split into the component beams S2' and S2", which form a defined angle a with one another. The component beams S2' and S2" are guided through the further optical system (not represented in FIG. 5) of the microscope 1 and evaluated for the purpose of determining the magnification of the microscope 1. The evaluation is described in more detail in PCT/EP 95/01311. In particular, reference is made there to FIGS. 1–7 and the description on pages 8–15. All the variants specified there can be used meaningfully here as regards picking up the measuring beam and evaluation.

FIG. 6 shows the problems associated with an inclined object plane with asymmetric distances a1 and a2 from the optical axis 11.

It is advantageous to combine the invention with measurement of magnification, as described, for example, in the abovementioned PCT/EP 95/01311. The information required for this is evident to the person skilled in the art from this PCT application; they are therefore deemed to be disclosed herein.

LIST OF REFERENCE SYMBOLS

A Focal plane
B, C Planes of object surfaces which are situated opposite the main objective 18
1 Microscope
2 Laser beam
2a Component laser beams
2b Component laser beams
3 Laser
5 Focal point
6 Object
7 Principal plane of the objective 18
8 Eyepiece
9a Stop
9b Stop
10 Transparent backing plate
11 Principal axis of the beam path
12a Deflecting mirror, semitransparent
12b Deflecting mirror
12c Non-aligned deflecting mirrors
12d Beam splitter
12e Beam litter 13 Distance between the luminous markings 20*a* and 20*b* which are produced on the object surface
14 Rotating pinhole stop/shutter wheel
15 Drive for pinhole stop
16 Hole
17 Deflecting mirror for time coding/beam-splitting device
17*a* Aligned deflecting mirror, semitransparent
17*b* Aligned deflecting mirror
18 Main objective
19 Evaluation unit with evaluation software
20*a* Luminous marking/optical image
20*b* Luminous marking/optical image
21 Distance display
22 Autofocus
23 Output for stereotactic applications
24 Optics holder
25 Deflecting mirror
26 Imaging system
27 Detector (for example CCD)
z Distance between object surface and main objective 18
χ Angle between the component laser beams S1, S2
S1, S2 Component laser beams 2*a*, 2*b* after their traversal of the main objective 18

What is claimed is:

1. Method for measuring a distance (Z) between an object (6) and a principal plane of a main objective (18) with the aid of an optical beam, characterized in that at least two component beams (2*a, b*), which can be distinguished from one another by coding, of the beam are directed in the parallel beam path upstream of the main objective (18) to pass through the latter onto the object (6), the component beams (2*a, b*) producing on the surface of the object (6) luminous points (20*a, b*; P(S1), P(S2)) whose distance (13) from one another is evaluated in an evaluation unit (19) as a measure for determining the distance (Z) by computer in the evaluation unit (19).

2. Method according to claim 1, characterized in that the two component beams (2*a, b*) are produced by splitting a single beam (2) by means of at least one semitransparent mirror (12*a*; 17*a*).

3. Method according to claim 1 characterized in that each component beam (2*a, b*) is geometrically coded in a distinguishable fashion, if appropriate via stops (9*a*, 9*b*), during the evaluation a right-left change of the projected images of the component beams about the optical axis (11) representing a plus-minus Z-displacement of the object (6) about the focal plane (A).

4. Method according to claim 1, characterized in that the component beams (2*a, b*) are coded by color or frequency, or are pulse modulated, color filters or image point integrators consequently being applied in the evaluation.

5. Device for carrying out a method according to claim 1, comprising a main objective (18) a principal plane of which is located at a distance (Z) from the surface of an object (6), characterized in that arranged downstream of the main objective (18) is at least one optical radiation source (3) which transmits at least two component beams (2*a, b*), which can be distinguished from one another by coding, through the main objective (18) in a direction of the object (6) in order to produce luminous points (20*a, b*; P(S1), P(S2)) on the surface of the object (6), and in that an evaluation unit (19) is provided which determines the distance (Z) between the main objective (18) and the surface of the object (6) by computer from the distance (13) between the luminous points (20*a, b*; P(S1), P(S2)).

6. Device according to claim 5, characterized in that transparent flat optics holders (10, 24) on which there are arranged small semitransparent and/or exclusively reflecting deflecting mirrors (12, 25) are provided for including the component beams (2*a, b*) and/or cutting out a portion of the radiation coming from the object (6).

7. Device according to claim 5, characterized in that immediately downstream of the main objective (18) the image information of the two component beams (2*a, b*) at the object (6) are imaged on a specially resolving optoelectronic detector (27), the detector (27) being connected to the evaluation unit (19), and the evaluation unit (19) being connected, if appropriate, to a distance display (21) and/or to a device for an autofocus (22), and/or to an output (23) for stereotactic measuring purposes.

8. Device according to claim 5, for carrying out a method using pulse-modulated component beams (2*a, b*), characterized in that the radiation source (3) is assigned a beam splitting device (17) upstream of which there is arranged a shutout wheel (14) or rotatable pinhole stopper (14) or LCD shutter elements.

9. Device according to claim 5, characterized in that the light of the component beams (2*a, b*) is selected to be in the infrared region.

10. Device according to claim 5, characterized in that additional beam-splitting mirrors (12*e, d*) are arranged in the beam path so as to produce two component beams S2' and S2" which can be evaluated with regard to determining the magnification of the optical system.

* * * * *